(12) United States Patent
Heschke et al.

(10) Patent No.: US 7,456,235 B2
(45) Date of Patent: *Nov. 25, 2008

(54) FLAME-RETARDANT COMPOSITION FOR COATING POWDERS

(75) Inventors: John E. Heschke, Olean, NY (US); Tanweer Ahsan, Rancho Santa Margarita, CA (US); Charles N. Volante, Allegany, NY (US); Charles S. Bischof, Allegany, NY (US)

(73) Assignee: Henkel Corporation, Rocky Hill, CT (US)

( * ) Notice: Subject to any disclaimer, the term of this patent is extended or adjusted under 35 U.S.C. 154(b) by 405 days.

This patent is subject to a terminal disclaimer.

(21) Appl. No.: 11/242,336

(22) Filed: Oct. 3, 2005

(65) Prior Publication Data

US 2006/0036006 A1 Feb. 16, 2006

Related U.S. Application Data

(63) Continuation-in-part of application No. 11/130,489, filed on May 17, 2005, now Pat. No. 7,338,993, which is a continuation of application No. 10/426,374, filed on Apr. 30, 2003, now Pat. No. 6,936,646.

(51) Int. Cl.
*C08K 5/3495* (2006.01)
*C08L 63/00* (2006.01)

(52) U.S. Cl. .......... 524/101; 524/99; 524/100; 524/400; 524/404; 524/436; 524/437; 523/400; 523/457

(58) Field of Classification Search ........... 524/99–101, 524/400, 404, 436, 437; 523/400, 457
See application file for complete search history.

(56) References Cited

U.S. PATENT DOCUMENTS

| | | | |
|---|---|---|---|
| 5,360,887 A | 11/1994 | Tsunemi et al. | |
| 5,439,957 A | 8/1995 | Takimoto et al. | |
| 5,648,436 A | 7/1997 | Janowitz et al. | |
| 5,739,187 A | 4/1998 | Asano et al. | |
| 6,097,100 A | 8/2000 | Eguchi et al. | |
| 6,103,797 A | 8/2000 | Klatt et al. | |
| 6,207,735 B1 * | 3/2001 | Kuma et al. | 524/100 |
| 6,232,377 B1 * | 5/2001 | Hayashi et al. | 524/100 |
| 6,414,059 B1 * | 7/2002 | Kobayashi et al. | 524/101 |
| 6,420,459 B1 | 7/2002 | Horold | |
| 6,528,558 B2 | 3/2003 | Lewin | |
| 6,660,811 B2 * | 12/2003 | Ogura et al. | 525/523 |
| 6,936,646 B2 * | 8/2005 | Ahsan et al. | 524/101 |
| 6,998,433 B2 * | 2/2006 | Overholt et al. | 524/404 |
| 2003/0092802 A1 | 5/2003 | Nakacho et al. | |
| 2003/0108746 A1 | 6/2003 | Choate et al. | |
| 2003/0125433 A1 | 7/2003 | Tamura et al. | |
| 2003/0201548 A1 | 10/2003 | Ikezawa et al. | |
| 2005/0209378 A1 | 9/2005 | Ahsan et al. | |
| 2006/0079612 A1 * | 4/2006 | Troutman et al. | 524/99 |

FOREIGN PATENT DOCUMENTS

| | | |
|---|---|---|
| EP | 629 665 | 12/1994 |
| EP | 978 542 | 2/2000 |
| JP | 10060229 | 3/1998 |
| JP | 11100492 | 4/1999 |

\* cited by examiner

*Primary Examiner*—Peter Szekely
(74) *Attorney, Agent, or Firm*—Steven C. Bauman

(57) ABSTRACT

A flame-retardant composition is provided that includes at least one melamine compound, at least one metal borate, at least one alkaline metal hydroxide, and optionally hydrated alumina. The flame-retardant composition can be used in coating powder compositions that also include a resin. The flame retardant coating powder composition can be applied to a substrate, such as an electrical or electronic device, and heated to a temperature sufficient to effect crosslinking of the resin and the curing agent to provide a flame resistant coating composition.

26 Claims, No Drawings

FLAME-RETARDANT COMPOSITION FOR COATING POWDERS

CROSS REFERENCE TO RELATED APPLICATION

This application is a continuation-in-part application of U.S. patent application Ser. No. 11/130,489, filed May 17, 2005 U.S. Pat. No. 7,338,993, which is a continuation of Ser. No. 10/426,374, now U.S. Pat. No. 6,936,646, filed Apr. 30, 2003.

BACKGROUND OF THE INVENTION

1. Field of the Invention

The present invention relates to flame retardant compositions useful for coating electrical and electronic devices.

2. Brief Description of Related Technology

Epoxy resins are widely used in coating powder compositions for coating electrical and electronic devices. Such epoxy coating powder compositions used for encapsulation are generally prepared from a blend of an epoxy resin and a phenol hardener, along with other ingredients including fillers, catalysts, flame-retardant materials, processing aids and colorants. Epoxy resins in such molding compounds are traditionally diepoxides which include two epoxy groups per molecule, which are reacted with a co-reactant (cross-linking agent or hardener) consisting of acid dianhydride, diamine or diphenol oligomers. Diphenol oligomers, such as those derived from novolac phenols, cresol phenols and bisphenol A, are particularly preferred in the art as hardeners due to their high reliability.

Flame-retardants in epoxy compositions are typically provided for safety purposes. A common flame-retardant system is a combination of bromine-containing flame retardants and antimony oxide flame-retardant synergists. However, these compounds are pollutants of the environment. Some bromine-containing flame retardants (especially brominated diphenyl ethers) are toxic and possibly carcinogenic. Antimony trioxide is classified by the International Agency for Research on Cancer as a Class 2B carcinogen (i.e., antimony trioxide is a suspect carcinogen based mainly on animal studies). In addition, this compound is often used at a relatively high level (2-15%) and is also slightly water-soluble, leading to further environmental concerns. This concern is highlighted by the fact that electrical and electronic manufacturers currently discard up to one half of the total amount of powder coating compositions used.

Phosphorus-containing compounds have been proposed as flame retardants. For example, U.S. Pat. No. 5,739,187 to Asano et al. discloses epoxy resin compositions as semiconductor encapsulants, which include a phosphorus-containing flame retardant to eliminate the use of antimony trioxide and brominated compounds. However, coating powder compositions containing conventional phosphorus compounds generally possess undesirable properties such as high moisture absorption, which can cause stress and cracking of the encapsulant at elevated temperatures.

Melamine cyanurate is commonly sold as a flame-retardant compound. Although effective as a flame retardant, high levels of this material oftentimes severely reduce the flowability of coating powder compositions. As a result, it has generally been considered impractical to incorporate melamine cyanurate into coating powder compositions at appropriate levels to achieve both adequate flame retardancy and flowability. Unfortunately, reducing the amount of the flame retardant to address the flowability issues compromises flame retardance, with the resulting coating powder compositions failing to meet the Underwriters Laboratories Inc. flame retardance standard, UL-94 V-O rating.

U.S. Pat. No. 6,097,100 discloses a semiconductor element encapsulated in a flame resistant resin composition containing an organic compound selected from the group consisting of organobromine compounds, organophosphorus compounds and organonitrogen compounds, an inorganic filler and a metal borate.

It would be desirable to provide flame-retardant coating powder compositions that overcome the aforementioned problems while providing commercially acceptable physical properties. Moreover, it would be desirable to provide coating powder compositions having good flowability and stress characteristics such as good thermal shock resistance while providing acceptable flame retardance under UL-94.

SUMMARY OF THE INVENTION

The present invention provides flame-retardant compositions comprising at least one melamine compound, at least one metal borate, and at least one alkaline-earth metal hydroxide.

Other aspects of the present invention include flame retardant coating powder compositions comprising:

(a) about 0.1 to about 3 wt. % of a melamine compound;

(b) about 1 to about 10 wt. % of a metal borate;

(c) about 1 to about 10 wt. % of an alkaline-earth metal hydroxide;

(d) about 0 to about 30 wt. % of hydrated alumina;

(e) about 1 to about 25 wt. % of a thermosetting resin; and (f) about 1 to about 10 wt. % of a curing agent for the resin; all based on the total weight of the coating powder composition.

Other aspects of the present invention include methods of using a flame retardant coating powder composition comprising: (a) applying a coating powder composition comprising at least one melamine compound, at least one metal borate, at least one alkaline-earth metal hydroxide, hydrated alumina, a resin, and a curing agent for the resin to a substrate; and (b) heating the coating powder composition to a temperature sufficient to effect crosslinking of the thermosetting resin and the curing agent.

Other aspects of the present invention include methods of coating an electrical or electronic device comprising: (a) applying a coating powder composition comprising at least one melamine compound, at least one metal borate, at least one alkaline-earth metal hydroxide, hydrated alumina, a resin, and a curing agent for the resin to a surface of an electrical or electronic device to coat the surface; and (b) heating the coating powder composition to a temperature sufficient to effect crosslinking of the thermosetting resin and the curing agent.

DETAILED DESCRIPTION

Other than in the operating examples or where otherwise indicated, all numbers or expressions referring to quantities of ingredients, reaction conditions, etc., used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

As used herein, the term "cured" is meant to indicate a three-dimensional crosslink network formed by covalent bond formation, e.g., between the functional groups of the hardener and the epoxy groups of the resin. The temperature at which the composition of the present invention cures is variable, and depends in part on the conditions and the type and amount of catalyst, if any, used.

The present invention provides flame-retardant compositions comprising at least one (one or more) melamine compound, at least one metal borate, at least one alkaline-earth metal hydroxide and, optionally, hydrated alumina.

Non-limiting examples of suitable melamine compounds include melamine, melamine cyanurate, melem, melam and mixtures thereof, preferably melamine cyanurate. Generally, the melamine compound is present in the composition in an amount ranging from about 0.1 to about 4 weight percent (wt. %) on a basis of total weight of the composition. In some embodiments, the melamine compound comprises about at least 0.1, in some cases at least 0.5, and in other cases at least 1 wt. % and up to 3, in some cases 2.5, and in other cases up to 2 wt. % based on the total weight of the composition.

Non-limiting examples of suitable metal borates include zinc borate, aluminum borate, magnesium borate and mixtures thereof, preferably zinc borate. Generally, the metal borate is present in the composition in an amount ranging from about 0.1 to about 10 wt. % on a basis of total weight of the composition. In some embodiments, the metal borate comprises about at least 0.1, in some cases at least 0.5 and in other cases at least 1 wt. % and up to 8, in some cases up to 6 and in other cases up to 5 wt. % based on the total weight of the composition. In some embodiments, the metal borate comprises about at least 1, in some cases at least 2.5 and in other cases at least 5 wt. % and up to about 10, in some cases up to 8 and in other cases up to 7 wt. % based on the total weight of the composition.

A non-limiting example of a suitable alkaline-earth metal hydroxide is magnesium hydroxide. Generally, the alkaline-earth metal hydroxide is present in the composition in an amount ranging from about 1 to about 25 weight percent on a basis of total weight of the composition. In some embodiments, the alkaline-earth metal hydroxide comprises about at least 1, in some cases at least 2.5 and in other cases at least 5 wt. % and up to 25, in some cases up to 20 and in other cases up to 15 wt. % based on the total weight of the composition. In some embodiments, the alkaline-earth metal hydroxide comprises about at least 1, in some cases at least 2.5 and in other cases at least 5 wt. % and up to about 10, in some cases up to 8 and in other cases up to 7 wt. % based on the total weight of the composition.

Preferably, the composition is substantially free of compounds containing a halogen, antimony or phosphorus, such as bromine- or phosphorus-containing flame retardants or antimony oxides. More preferably, the composition is free of compounds containing a halogen, antimony or phosphorus. As used herein, "substantially free" means that a material is present as an incidental impurity, and generally is present in an amount of less than about 1 wt. %, preferably less than about 0.5 wt. %, and more preferably the composition is free of the impurity. In other words, the material is not intentionally added to an indicated composition, but may be present at minor or inconsequential levels because it was carried over as an impurity as part of an intended composition component. Such materials can include, for example, compounds containing halogens, antimony or phosphorus.

The composition can further comprise one or more hydrated metal salts different from the metal borate and alkaline-earth metal hydroxides discussed above. As used herein the term "hydrated metal salts" is meant to indicate metal salts that contain water in the form of water of crystallization, i.e., water present in metal salt crystals in definite proportions, such as water molecules that occupy lattice positions in the metal salt crystals. Hydrated metal salts useful in the present invention liberate at least a portion of the water they contain when heated. Suitable hydrated metal salts include Group IIB oxides such as zinc oxide and polyhydroxides such as alumina or aluminum trihydrate ($Al(OH)_3$).

When the metal oxide is present, it may be present at a level of at least 0.1 percent, in some cases at least 0.15 percent, in other cases at least 0.2 percent, and in some situations at least 0.25 percent by weight of the composition. The metal oxide can be present at a level sufficient to impart the desired fire retardancy properties in combination with the additional flame-retardant components. The metal oxide can be present in an amount of up to 1 percent, in some cases up to 0.85 percent, in other cases up to 0.75 percent, and in some situations up to 0.5 percent by weight of the composition. If the amount of the metal oxide is too high, the viscosity of the composition may be too high and the molding composition may become difficult to handle. The composition may contain the metal oxide in any range of values inclusive of those stated above.

In some embodiments, the composition further comprises hydrated alumina. Generally, the hydrated alumina is present in the composition in an amount ranging from about 1 to about 65 wt. % on a basis of total weight of the composition. In some embodiments, the hydrated alumina comprises at least 1, in some cases at least 2.5 and in other cases at least 5 wt. % and up to 65, in some cases up to 50 and in other cases up to 30 wt. % based on the total weight of the composition. In some embodiments, the hydrated alumina comprises about at least 1, in some cases at least 2.5 and in other cases at least 5 wt. % and from about up to 30, in some cases up to 25 and in other cases up to 20 wt. % based on the total weight of the composition.

Each of the components of the flame-retardant composition discussed above can be present in the flame-retardant composition at a stated level or can range between any of the levels recited above.

In some embodiments, the composition is a coating powder composition that further comprises at least one thermosetting resin and, optionally, a curing agent for the resin.

Any suitable resin can be used in the coating powder composition of the present invention. Non-limiting examples of suitable thermosetting resin include bisphenol A-type epoxy resins, bisphenol F-type epoxy resins, novolac-type epoxy resins, alicyclic epoxy resins, glycidyl-type epoxy resins, biphenyl-type epoxy resins, naphthalene ring-containing epoxy resins, cyclopentadiene-containing epoxy resins, polyfunctional epoxy resins, and combinations thereof. The coating powder compositions can include more than one epoxy resin, for example, a combination of epoxy cresol novolac resin and bisphenol A epoxy resin.

As noted above, bisphenol and biphenyl epoxy resins, which are traditionally referenced as di-epoxies, and epoxy cresol novolac resins, which are traditionally referenced as multifunctional epoxies, are useful in the present invention. Such epoxies have a degree of branching of two, in that two phenolic groups having pendant epoxies are linked through the same carbon atom. For example, diglycidyl ether of bisphenol A is difunctional, including two phenolic groups with pendant epoxies extending from a central carbon atom. It therefore has a degree of branching of two. Epoxy cresol novolac resins are oftentimes referenced as "multifunctional", in that they are polymeric compounds with a plurality of pendant epoxy moieties which may extend from the polymeric chain. For example, epoxy cresol novolac resins include the following structure:

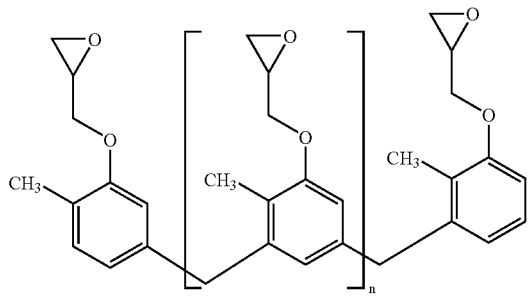

In the instance where n=0, the functionality if this structure would be 2. If n=1, the functionality, is 3, if n=4, the functionality is 4, etc. As such, this compound is traditionally referred to as a multifunctional epoxy resin. However, since only two phenolic groups extend from the same carbon or small cluster of carbons, the degree of branching of this type of resin would be equal to two.

In some embodiments, the epoxy resin is a multifunctional epoxy resin having a degree of branching within the resin backbone of at least three. These multifunctional epoxy resins are those derived from phenol and which include at least three phenolic groups branching directly from the same central carbon atom or central cluster of carbons, with a pendant oxirane group linked to each of the at least three phenolic groups.

Non-limiting examples of useful multifunctional epoxy resins having a degree of branching of at least three include:

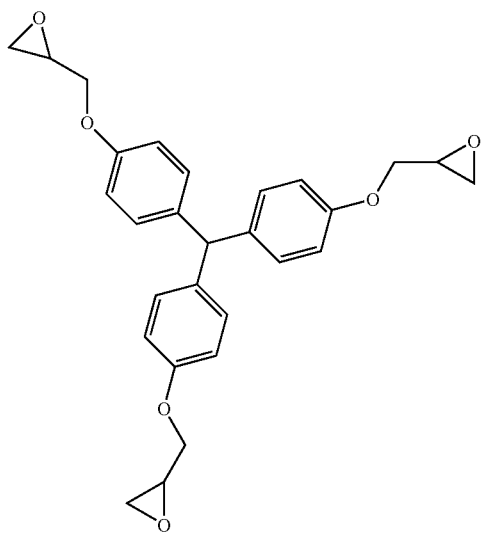

triphenylol methane triglycidyl ether (having a degree of branching of three, represented by three terminal glycidyl ether moieties branching from a central carbon atom); and

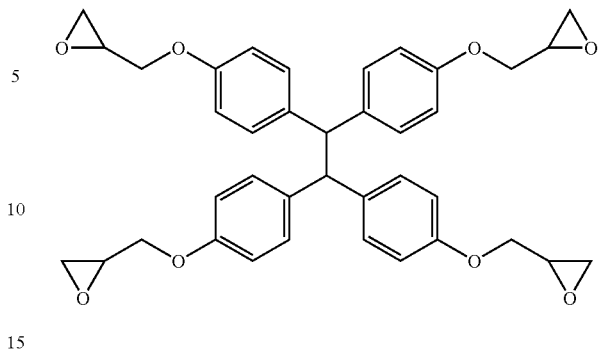

tetra glycidyl ether of tetra phenol ethane (having a degree of branching of four, represented by four terminal glycidyl ether moieties branching from a central two carbon cluster ethyl moiety).

The multifunctional resin having a degree of branching of at least three may be used alone, or in combination with conventional resins such as those described above.

Useful epoxy resins include those derived from tris-phenolmethane, such as triphenylol methane triglycidyl ether. Other useful resins include, but are not limited to, resins of $C_6$-$C_{28}$ alkyl glycidyl ethers; polyglycidyl ethers of pyrocatechol, resorcinol, hydroquinone, 4,4'-dihydroxydiphenyl methane, 4,4'-dihydroxy-3,3'-dimethyldiphenyl methane, 4,4'-dihydroxydiphenyl dimethyl methane, 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris(4-hydroxyphyenyl) methane; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain paraffins; polyglycidyl ethers of N,N'-diglycidyl-aniline; N,N'-dimethyl-N,N'-diglycidyl-4,4'-diaminodiphenyl methane; N,N,N',N'-tetraglycidyl-4,4'-diaminodiphenyl methane; N-diglycidyl-4-aminophenyl glycidyl ether; N,N,N',N'-tetraglycidyl-1,3-propylene bis-4-aminobenzoate; bisphenol A epoxy resin, bisphenol F epoxy resin, phenol novolac epoxy resin, cresol novolac epoxy resin, and combinations thereof. Examples of useful epoxy resins include EPON 1001F bisphenol A epoxy resin commercially available from Resolution Performance Products, EPON 2012 bisphenol A novolac epoxy resin commercially available from Resolution Performance Products, and ESCN 195XL epoxy cresol novolac resin commercially available from Sumitomo Bakelite.

The epoxy resin typically has a theoretical epoxy equivalent weight of about 150 to 250. The epoxy resin is typically present in the molding composition at a level of from about at least 1, in some cases at least 2.5 and in other cases at least 5 wt. % and up to about 25, in some cases up to 20 and in other cases up to 15 wt. % based on the total weight of the composition. The resin can be present in the coating powder composition at a stated level or can range between any of the levels recited above.

The curing agent (hardener) promotes crosslinking of the coating powder composition to form a polymer composition upon heating of the composition to a temperature of at least about 110° C. Non-limiting examples of suitable curing agents that can be included in the coating powder compositions of the present invention include amine type hardeners, phenol novolac type hardeners, cresol novolac type hardeners, dicyclopentadiene phenol type hardeners, limonene type hardeners, and anhydrides. Flexible hardeners having a hydroxyl equivalent weight greater than about 150 are often desirable, such as xylock novolac type hardener. Non-limiting examples of flexible hardeners include bisphenol M commercially available from Borden Chemical, DEH 85 commercially available from Dow Chemical, Epicure P-101 amine hardener commercially available from Resolution Performance Products and 3,3',4,4'-benzophenonetetracarboxylic anhydride (BTDA). More than one type of curing agent can be included in the coating powder compositions. The curing agent is typically present in the composition of the present invention in an amount of about 1 percent by weight to about 10 percent by weight, often from about 1.5 percent by weight to about 6 percent by weight, based on the total weight of the composition. In some embodiments, the curing agent comprises about at least 1, in some cases at least 2.5 and in other cases at least 5 wt. % and up to about 10, in some cases up to 8 and in other cases up to 7 wt. % based on the total weight of the coating powder composition. The curing agent can be present in the coating powder composition at a stated level or can range between any of the levels recited above.

In an embodiment of the invention, the coating powder composition can further comprise at least one inorganic filler. Any suitable inorganic filler can be used in the invention, such as for example silica, alumina, aluminosilicate, aluminum trihydrate, silicon nitride, clay, talc, mica, kaolin, calcium carbonate, wollastonite, montmorillonite, smectite, and mixtures thereof. Generally, the inorganic fillers comprise about at least 1, in some cases at least 5 and in other cases at least 10 wt. % and up to about 60, in some cases up to 40 and in other cases up to 25 wt. % based on the total weight of the coating powder composition. The inorganic fillers can be present in the coating powder composition at a stated level or can range between any of the levels recited above.

The present coating powder composition may include other suitable flame retardants known in the art in addition to those set forth above. Non-limiting examples of suitable flame retardants include, but are not limited to, transition metal oxides such as tungsten trioxide, molybdenum trioxide, zinc molybdate, calcium molybdate, and mixtures thereof. The other flame retardants may comprise up to about 3 percent by weight based on the total weight of the composition, optionally from about 0.4 percent by weight to about 2.8 percent by weight based on the total weight of the composition.

A coupling agent, such as a silane-type coupling agent, may be included in the composition in amounts of from about 0 to about 2 percent by weight, more often from about 0.3 to about 1 percent by weight.

Ion scavengers, such as magnesium aluminum carbonate hydrate, commercially available from Kyowa Chemical Industry Co. Ltd. under the trade name "DHT-4A," are suitable for use in the composition of the present invention and may be present in amounts of from about 0 to about 2 percent by weight, more often from about 0.5 to about 2 percent by weight.

Examples of additional additives may include stress relievers, such as polyphenylene oxide; elastomers, such as powdered silicone; and adhesion promoters, such as azine adhesion promoters, which may be present in amounts of from about 0 to about 3 percent by weight, when present.

The coating powder composition can comprise about 0.1 wt. % to about 10 wt. % of each of one or more other additives. The other additives may include, but are not limited to, colorants, mold release agents, coupling agents, catalysts, ion scavengers, metal oxides, metal hydroxides, pigments, adhesion promoters, toughening agents, UV absorbers and antioxidants.

Auxiliary catalysts, such as 1,8-diazabicyclo[5.4.0]undecene-7 (DBU), triphenylphosphine (TPP), dicyandiamide (DICY) and 2-methylimidazole, are suitable for use in the composition of the present invention and may be present in amounts of from about 0 to about 10 percent by weight, more often from about 0.5 to about 2 percent by weight, when present.

some embodiments of the invention provide flame-retardant compositions that comprise about 0.1 to about 3 wt. % of a melamine compound, about 1 to about 10 wt. % of a metal borate, about 1 to about 10 wt. % of an alkaline-earth metal hydroxide, about 0 to about 30 wt. % of hydrated alumina, about 1 to about 25 wt. % of a resin, and about 1 to about 10 wt. % of a curing agent for the resin, all based on the total weight of the composition.

The compositions of the present invention can be prepared by any conventional method. For example, as is known in the art, all of the components of the composition can be combined and finely ground and dry blended, or the components can be mixed in a step-wise fashion to enhance homogeneous mixing. The mixture can then be treated on a hot differential roll mill, such as with a large two-roll mill (one roll heated to about 90° C., and the other cooled with tap water), to produce uniform sheets, which are then ground to a powder after cooling. Alternatively, the mixture can be extruded through a twin screw extruder, as known in the art.

Another embodiment of the invention is directed to a method of providing a flame-retardant coating powder composition that includes applying the above-described coating powder composition to a substrate and heating the coating powder composition to a temperature sufficient to effect crosslinking of the resin and the curing agent.

The present invention is also directed to a method of coating an electrical or electronic device by heating the above-described coating powder composition to a temperature sufficient to cure the coating powder composition and form a polymer on the surface of the device. The coating can be applied to a pre-heated device and post-cured for about 30 to 120 minutes at a temperature of about 110° C. to about 180° C.

The preferred coating powder compositions cure in about 0.5 minute to about 3 minutes, more preferably, about 1 minute to about 2 minutes.

In a particular embodiment of the invention, the coating powder composition passes the UL 94 (ISBN 0-7629-0082-2) vertical burn test for flammability of plastic materials for parts in devices and appliances at a thickness of 6 mm or less.

The coating powder compositions of the present invention typically demonstrate a flammability rating of UL 94V-1, more preferably, a flammability rating of UL 94V-0. The UL 94 ratings are generally accepted flammability performance standards for materials. They are intended to provide an indication of a material's ability to extinguish a flame, once ignited. Several ratings can be applied based on the rate of burning, time to extinguish, ability to resist dripping and whether or not drips are burning. The ratings are determined by measuring the total burn time of a ⅛" or ¼" thick bar according to the UL 94 flammability test. A 94V-0 indicates that burning stops within 10 seconds on a vertical specimen with no drips allowed. A 94V-1 rating requires that burning stops within 30 seconds on a vertical specimen with no drips allowed.

As noted above, the compositions of the present invention are particularly useful as coating powder compositions for electrical or electronic devices. In a further embodiment, the present invention provides a method for coating an electrical or electronic device. Non-limiting examples of such electrical or electronic devices include semiconductors, transistors, diodes, capacitors and integrated circuits. The method involves applying to or contacting a surface of an electronic device with the coating powder composition, such as by coating the composition onto a surface of the device. The device including the coating composition thereon is then heated to a temperature sufficient to cure the composition and form a polymer on the surface of the device. Preferably, the temperature to which the composition is heated is typically at least about 110° C., often up to about 165° C. or up to about 200° C.

The invention will now be described by the following examples. The examples are intended to be illustrative only and are not intended to limit the scope of the invention.

EXAMPLES

Example 1

Six coating powder compositions represented as Samples 1-4 were prepared according to the formulations as indicated in Table 1 below. Each coating powder composition contained the specified resins and hardeners shown, with and without the melamine cyanurate, zinc borate and magnesium hydroxide as flame retardants. The weight % (wt %) of each component indicated below is based upon the total weight of the compositions.

TABLE 1

|  | Amine cured | | Anhydride cured | |
| --- | --- | --- | --- | --- |
|  | Sample No. | | | |
|  | 1 | 2 | 3 | 4 |
| Bisphenol-A resin[1] | 40.04 | 40.04 | 26.86 | 26.86 |
| Bisphenol-A resin[2] | 7.46 | 7.46 | — | — |
| Bisphenol-A novolac[3] | — | — | 17.43 | 17.43 |
| Epoxy cresol novolac[4] | — | — | 8.61 | 8.61 |
| Amine hardener[5] | 8.69 | 8.69 | — | — |
| Amine hardener[6] | — | — | 1.4 | 1.4 |
| Melamine cyanurate[7] | 1.0 | — | 1.0 | — |
| Zinc borate[8] | 6.0 | — | 4.0 | — |
| Magnesium hydroxide | 4.0 | — | 4.0 | — |
| Hydrated alumina[9] | — | — | 15.0 | — |
| Fused silica filler[10] | 26.06 | 37.06 | 16.85 | 40.85 |
| Pigment | 4.0 | 4.0 | 4.0 | 4.0 |
| Wax[11] | 2.0 | 2.0 | — | — |
| Flow modifier[12] | 0.2 | 0.2 | 0.2 | 0.2 |
| Triphenyl phosphene catalyst | 0.2 | 0.2 | — | — |
| Silane crosslinker[13] | 0.35 | 0.35 | 0.4 | 0.4 |
| Lubricant[14] | — | — | 0.25 | 0.25 |

[1]Epon 1001F bisphenol-A resin from Resolution Performance Products.
[2]2004 bisphenol-A resin from Resolution Performance Products.
[3]Dow 642U Bisphenol-A novolac resin from Dow Chemical Co.
[4]ESCN 195XL Epoxy cresol novolac resin from Sumitomo Bakelite.
[5]Curezol 2MZ azine adhesion promoter (amine hardener) from Shikoku Fine Chemical Corp.
[6]Epicure P-101 amine hardener from Resolution Performance Products.
[7]Melamine cyanurate, MC25, DSM Melapur.
[8]Firebrake ZB zinc borate from US Borax Inc.
[9]AC470 hydrated alumina from Aluchem Inc.
[10]Tecosil fused silica filler from C & E Minerals.
[11]Castorwax 73056 hydrogenated castor oil from Gaschem Inc.
[12]Resiflow P-67 H flow modifier from Estron Chemical.
[13]Silquest ® A-187 ™ 3-glycidoxy-propyltrimethyoxysilane crosslinker from Union Carbide Inc.
[14]Glycerol monostearate lubricant from Northwestern Chemical Co.

The coating powder compositions of Samples 1-4 were cured at 300° F. for 3 min. and postcured at 300° F. for one hour and tested for flammability, with the results shown in Table 1. The flammability properties of the cured compositions were determined by the total burn time of a ¼-inch molded bar according to the UL 94V0 test. According to the UL 94V-0 test method, the coating powder composition was dispensed into molds and cured into ¼- or ⅛-inch test pieces. Five test pieces are arranged such that the middle of a flame may contact the end portion of the test piece. The flame is maintained in such position relative to the test piece for a period of 10±0.5 seconds. The amount of time the test piece continues to flame after removal of the flame is termed the afterflame time. Once the test piece stops afterflaming, the flame is positioned toward the same portion of the test piece for an additional period of time of 10±0.5 seconds. After this time period, the flame is removed and this second afterflame time is measured. The afterglow time is also measured thereafter. After each flame application, five results are measured for the test pieces: (1) the first afterflame time; (2) the second afterflame time; (3) the afterglow time after the second afterflaming; (4) whether the test pieces burn to the clamps; and (5) whether the test pieces drip flaming particles. From these results, criteria conditions may be measured to determine whether the sample meets a V-0 designation. The general criteria conditions are set forth below:

| Criteria Conditions | V-0 | V-1 | V-2 |
| --- | --- | --- | --- |
| Afterflame time (first or second) | 10 sec. | 30 sec. | 30 sec. |
| Total afterflame time for any condition set | 50 sec. | 250 sec. | 250 sec. |
| Afterflame plus afterglow time for each individual specimen after the second flame application | 30 sec. | 60 sec. | 60 sec. |
| Afterflame or afterglow of any specimen up to the holding clamp | No | No | No |
| Cotton indicator ignited by flaming particles or drops | No | No | Yes |

The results for ¼-inch bars are shown in Table 2 below.

TABLE 2

| TEST | SAMPLE 1 | | SAMPLE 2 | | SAMPLE 3 | | SAMPLE 4 | |
| --- | --- | --- | --- | --- | --- | --- | --- | --- |
| PROCEDURE | 1st | 2nd | 1st | 2nd | 1st | 2nd | 1st | 2nd |
| Flammability Test (UL 94) (sec) | 1 | 5 | — | — | 0 | 1 | — | — |
|  | 2 | 6 | — | — | 0 | 2 | — | — |
|  | 1 | 3 | — | — | 0 | 1 | — | — |
|  | 0 | 4 | — | — | 0 | 3 | — | — |
|  | 1 | 3 | — | — | 0 | 0 | — | — |
| Total Burn Time (sec) | 26 | | Bars burned to clamp | | 7 | | Bars burned to clamp | |
| UL 94 Status | Passed | | Failed | | Passed | | Failed | |

The results of Table 2 demonstrate that molded specimens prepared from compositions of Samples 1 and 3 having melamine cyanurate, zinc borate and magnesium hydroxide according to the present invention exhibited sufficient flame retardancy achieve a UL94V-O rating, compared to specimens made without the above mentioned flame retardants (Samples 2 and 4) that failed the UL94V-O test.

Example 2

A coating powder composition represented as Sample 5 was prepared according to the formulation as indicated in Table 3 below, using the same components as in Sample 1 above except as indicated. The coating powder composition included various epoxy resins cured with an amine hardener, melamine cyanurate, zinc borate and magnesium hydroxide as flame retardants. The weight % (wt %) of each component indicated below was calculated based upon the total weight of the coating powder composition.

TABLE 3

| Component | Sample 5 |
|---|---|
| Bisphenol-A resin[1] | 22.44 |
| Bisphenol-A novolac resin | 17.5 |
| Epoxy cresol novolac resin | 8.3 |
| Amine hardener[2] | 2.86 |
| Melamine cyanurate | 1.0 |
| Zinc borate | 4.0 |
| Magnesium hydroxide | 4.0 |
| Hydrated alumina | 17.5 |
| Fused silica filler | 17.5 |
| Pigments | 4.0 |
| Flow modifier | 0.2 |
| Silane crosslinker | 0.4 |
| Lubricant | 0.3 |

[1]1001F bisphenol-A resin from Resolution Performance Products.
[2]P-101 amine hardener from Resolution Performance Products.

The above materials were mixed together and run through a two roll (hot and cold) mill to provide melt mixing. After hardening, the sheet was removed and ground in the analytical grinder and sieved—60 mesh. Samples were prepared and tested for UL94 rating in a manner similar to that set forth above for Example 1. Results of the testing are set forth in Tables 4 and 5.

TABLE 4

| ¼-inch Bars | |
|---|---|
| 1st Burn | 2nd Burn |
| 0 seconds | 1 second |
| 0 | 1 second |
| 0 | 0 |
| 0 | 0 |
| 0 | 0 |

TABLE 5

| ⅛-inch Bars | |
|---|---|
| 1st Burn | 2nd Burn |
| 0 seconds | >60 seconds |
| 0 seconds | >60 seconds |

The results of Table 4 demonstrate that ¼ inch thickness molded specimens prepared from the composition of Sample 5 having melamine cyanurate, zinc borate and magnesium hydroxide according to the present invention exhibited sufficient flame retardancy achieve a UL 94 V-0 rating.

Example 3

A coating powder composition represented as Sample 6 was prepared according to the formulation as indicated in Table 6 below, using the same components as in Sample 1 above except as indicated. The coating powder composition contained various resins cured with an amine hardener, and melamine cyanurate, zinc borate and magnesium hydroxide as flame retardants. The weight % (wt %) indicated below were calculated based on the total weight of the composition.

TABLE 6

| | Sample 6 |
|---|---|
| Bisphenol-A resin[1] | 26.86 |
| Bisphenol-A novolac resin | 17.43 |
| Epoxy cresol novolac resin | 8.61 |
| Amine hardener[2] | 2.8 |
| Melamine cyanurate | 1.0 |
| Zinc borate | 4.0 |
| Magnesium hydroxide | 4.0 |
| Hydrated alumina | 15.0 |
| Fused silica filler | 15.45 |
| Pigment | 4.0 |
| Flow modifier | 0.2 |
| Silane crosslinker | 0.4 |
| Lubricant | 0.25 |

[1]Epon 1001F bisphenol-A resin from Resolution Performance Products.
[2]Epicure P-101 amine hardener from Resolution Performance Products.

The coating powder composition of Sample 6 was cured at 300° F. for 3 min. and postcured at 300° F. for one hour and tested for flammability, with the results shown in Table 7.

TABLE 7

| ¼-inch Bars | |
|---|---|
| 1st Burn | 2nd Burn |
| 0 seconds | 2 seconds |
| 0 | 6 |
| 1 | 2 |
| 0 | 5 |
| 0 | 1 |

The results of Table 7 demonstrate that ¼ inch thickness molded specimens prepared from the composition of Sample 6 having melamine cyanurate, zinc borate and magnesium hydroxide according to the present invention exhibited sufficient flame retardancy achieve a UL 94 V-0 rating.

Example 4

A coating powder composition represented as Sample 7 was prepared according to the formulation as indicated in Table 8 below. The coating powder composition included various resins cured with an amine hardener, and melamine cyanurate, zinc borate and magnesium hydroxide as flame retardants. The weight % (wt %) indicated below were calculated based on the total weight of the composition.

TABLE 8

| | Sample 7 |
|---|---|
| Bisphenol-A novolac resin[1] | 32.5 |
| Bisphenol-A novolac resin[2] | 16.8 |
| Epoxy cresol novolac resin | 8.4 |
| Amine hardener[3] | 2.7 |
| Melamine cyanurate | 1.0 |
| Zinc borate | 4.0 |
| Magnesium hydroxide | 4.0 |
| Hydrated alumina | 17.5 |
| Fused silica filler | 5.5 |
| Pigment | 5.0 |
| Silane crosslinker | 0.4 |
| Wax | 2.0 |
| Flow modifier | 0.2 |

[1]DPS 3002 Bisphenol-A novolac resin from Resolution Performance Products.
[2]Dow 642U Bisphenol-A novolac resin from Dow Chemical Co.
[3]Epicure P-101 amine hardener from Resolution Performance Products.

The coating powder composition of Sample 7 was cured at 300° F. for 3 min. and postcured at 300° F. for one hour and tested for flammability, gel time, and shelf life stability, with the results shown in Table 8.

TABLE 8

¼-inch Bars

| 1st Burn | 2nd Burn |
|---|---|
| 0 seconds | 1 second |
| 0 | 3 |
| 0 | 3 |
| 0 | 3 |
| 0 | 5 |

The results of Table 8 demonstrate that ¼ inch thickness molded specimens prepared from the composition of Sample 7 having melamine cyanurate, zinc borate and magnesium hydroxide according to the present invention exhibited sufficient flame retardancy achieve a UL 94 V-0 rating.

Example 5

A coating powder composition represented as Sample 8 was prepared according to the formulation as indicated in Table 9 below, using the same components as in Sample 1 above except as indicated. The powder composition contained various resins cured with an anhydride, and melamine cyanurate, zinc borate and magnesium hydroxide as flame retardants. The weight % (wt %) indicated below where calculated based on the total weight of the composition.

TABLE 9

| | Sample 8 |
|---|---|
| Bisphenol-A resin[1] | 41.56 |
| Anhydride[2] | 10.16 |
| Melamine cyanurate | 1.0 |
| Zinc borate | 6.0 |
| Magnesium hydroxide | 4.0 |
| Fused silica filler | 23.0 |
| Pigment | 4.0 |
| Wax | 2.0 |
| Flow modifier | 0.2 |
| Triphenyl phosphene | 0.2 |
| Silane/Bisphenol-A Mixture (cross-linked) | 7.88 |

[1] Epon 1001F bisphenol-A resin from Resolution Performance Products.
[2] 3,3',4,4'-benzophenonetetracarboxylic anhydride (BTDA).
[3] IM0360 silane/bisphenol-A Mixture (cross-linked) from Henkel Technologies.

The coating powder composition of Sample 8 was cured at 300° F. for 3 min. and postcured at 300° F. for one hour and tested for flammability as described above for Sample 1, with the results shown in Table 10.

TABLE 10

¼-inch Bars

| 1st Burn | 2nd Burn |
|---|---|
| 0 seconds | 3 seconds |
| 1 | 4 |
| 1 | 3 |
| 1 | 1 |
| 1 | 2 |

The results of Table 10 demonstrate that ¼ inch thickness molded specimens prepared from the composition of Sample 8 having melamine cyanurate, zinc borate and magnesium hydroxide according to the present invention exhibited sufficient flame retardancy achieve a UL 94 V-0 rating.

What is claimed is:

1. A flame-retardant composition comprising:
   (a) a flame retardant formulation consisting essentially of at least one melamine compound, at least one metal borate, and at least one alkaline-earth metal hydroxide;
   (b) at least one thermosetting resin; and
   (c) an inorganic filler material present in the composition in an amount ranging from about 1 to about 60 weight percent on a basis of total weight of the composition,
   wherein the composition is substantially free of compounds containing a halogen, an antimony, or a phosphorus.

2. The composition according to claim 1, wherein the at least one melamine compound is selected from the group consisting of melamine, melamine cyanurate, melem, melam and mixtures thereof.

3. The composition according to claim 2, wherein the at least one melamine compound is melamine cyanurate.

4. The composition according to claim 1, wherein the at least one melamine compound is present in the composition in an amount ranging from about 0.1 to about 4 weight percent on a basis of total weight of the composition.

5. The composition according to claim 1, wherein the at least one metal borate is selected from the group consisting of zinc borate, aluminum borate, magnesium borate and mixtures thereof.

6. The composition according to claim 5, wherein the at least one metal borate is zinc borate.

7. The composition according to claim 1, wherein the at least one metal borate is present in the composition in an amount ranging from about 0.1 to about 10 weight percent on a basis of total weight of the composition.

8. The composition according to claim 1, wherein the at least one alkaline-earth metal hydroxide is magnesium hydroxide.

9. The composition according to claim 1, wherein the at least one alkaline-earth metal hydroxide is present in the composition in an amount ranging from about 1 to about 25 weight percent on a basis of total weight of the composition.

10. The composition according to claim 1, wherein the composition is free of compounds containing a halogen, antimony or phosphorus.

11. The composition according to claim 1, wherein the composition further comprises hydrated alumina.

12. The composition according to claim 11, wherein the at least one hydrated alumina is present in the composition in an amount ranging from about 1 to about 65 weight percent on a basis of total weight of the composition.

13. The composition according to claim 1, wherein the thermosetting resin is selected from the group consisting of bisphenol A-type epoxy resins, bisphenol F-type epoxy resins, novolac-type epoxy resins, alicyclic epoxy resins, glycidyl-type epoxy resins, biphenyl-type epoxy resins, naphthalene ring-containing epoxy resins, cyclopentadiene-containing epoxy resins, polyfunctional epoxy resins, and combinations thereof.

14. The composition according to claim 13, wherein the glycidyl-type epoxy resin is selected from the group consisting of $C_6$-$C_{28}$ alkyl glycidyl ethers; polyglycidyl ethers of pyrocatechol, resorcinol, hydroquinone, 4,4'-dihydroxydiphenyl methane, 4,4'-dihydroxy-3,3 '-dimethyldiphenyl methane, 4,4'-dihydroxydiphenyl dimethyl methane, 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris(4-hydroxyphyenyl) methane; polyglycidyl ethers of novolacs; polyglycidyl ethers of diphenols; polyglycidyl ethers of polyphenols; polyglycidyl ethers of N,N'-diglycidyl-aniline; N,N'-dimethyl-N,N'-diglycidyl-4,4'-diaminodiphenyl methane; N,N,N',N'-tetraglycidyl-4,4'-diaminodiphenyl methane; N-diglycidyl-4-aminophenyl glycidyl ether; and N,N,N',N'-tetraglycidyl-1,3-propylene bis-4-aminobenzoate, and combinations thereof.

15. The composition according to claim 1, further comprising at least one curing agent for the thermosetting resin.

16. The composition according to claim 15, wherein the at least one curing agent is selected from the group consisting of amine-type hardener, dicyandiamide, phenol novolac-type hardener, cresol novolac-type hardener, dicyclopentadiene phenol-type hardener, limonene-type hardener, flexible-type hardener, anhydrides, and combinations thereof.

17. The composition according to claim 15, wherein the thermosetting resin comprises a multifunctional epoxy resin derived from phenol and having a degree of branching of at least three, and wherein the curing agent is an amine-type hardener.

18. The composition of claim 16, wherein the resin comprises bisphenol A-type epoxy resin and wherein the curing agent is an amine-type hardener.

19. The composition according to claim 1, wherein the inorganic filler is selected from the group consisting of silica, alumina, aluminosilicate, aluminum trihydrate, silicon nitride, clay, talc, mica, kaolin, calcium carbonate, wollastonite, montmorillonite, smectite and mixtures thereof.

20. A flame retardant coating powder composition comprising: (a) about 0.1 to about 3 wt. % of a melamine compound; (b) about 1 to about 10 wt. % of a metal borate; (c) about 1 to about 10 wt. % of an alkaline-earth metal hydroxide; (d) about 0 to about 30 wt. % of hydrated alumina; (e) about 1 to about 25 wt. % of a thermosetting resin; and (f) about 1 to about 10 wt. % of a curing agent for the resin; all based on the total weight of the coating powder composition.

21. A molded article prepared from the composition according to claim 1, wherein the article passes the UL 94 (ISBN 0-7629-0082-2) test for flammability of plastic materials for parts in devices and appliances at a thickness of 6 mm or less.

22. A method of using a flame retardant coating powder composition comprising:
(a) applying a coating powder composition comprising: (i) a flame retardant formulation consisting essentially of at least one melamine compound, at least one metal borate, and at least one alkaline-earth metal hydroxide, (ii) hydrated alumina, (iii) a thermosetting resin, (iv) an inorganic filler material, and (v) a curing agent for the resin to a substrate; and
(b) heating the coating powder composition to a temperature sufficient to effect crosslinking of the thermosetting resin and the curing agent,
wherein the coating powder composition is substantially free of compounds containing a halogen, an antimony, or a phosphorus.

23. A method of coating an electrical or electronic device comprising:
(a) applying a coating powder composition comprising: (i) a flame retardant formulation consisting essentially of at least one melamine, at least one metal borate, and at least one alkaline-earth metal hydroxide, (ii) hydrated alumina, (iii) a thermosetting resin, (iv) an inorganic filler material, and (v) a curing agent for the resin to a surface of an electrical or electronic device to coat the surface; and
(b) heating the coating powder composition to a temperature sufficient to effect crosslinking of the thermosetting resin and the curing agent,
wherein the coating powder composition is substantially free of compounds containing a halogen, an antimony, or a phosphorus.

24. The method according to claim 23, wherein the temperature ranges from about 135° C. to about 195° C.

25. The method according to claim 23, wherein the device comprises a semiconductor, a transistor, a diode, capacitor, integrated circuit or other electronic or electrical component.

26. An electrical or electronic device formed by the method of claim 23.

* * * * *